(12) United States Patent
Grünewald

(10) Patent No.: US 8,678,337 B2
(45) Date of Patent: Mar. 25, 2014

(54) DEVICE FOR FASTENING A FIXTURE TO A FASTENING STRUCTURE OF A VEHICLE

(75) Inventor: Rolf Grünewald, Neumünster (DE)

(73) Assignee: Diehl Service Modules GmbH, Hamburg (DE)

( * ) Notice: Subject to any disclaimer, the term of this patent is extended or adjusted under 35 U.S.C. 154(b) by 287 days.

(21) Appl. No.: 13/274,760

(22) Filed: Oct. 17, 2011

(65) Prior Publication Data

US 2012/0145857 A1 Jun. 14, 2012

(30) Foreign Application Priority Data

Oct. 18, 2010 (EP) .................................... 10187953

(51) Int. Cl.
*F16M 13/00* (2006.01)

(52) U.S. Cl.
USPC ...... 248/429; 248/424; 297/216.5; 297/344.1

(58) Field of Classification Search
USPC ................. 248/424, 429, 419, 430, 420, 501; 297/344.1, 216.3; 411/84, 85
See application file for complete search history.

(56) References Cited

U.S. PATENT DOCUMENTS

| | | | |
|---|---|---|---|
| 4,089,500 A * | 5/1978 | Gustafsson | ................... 248/429 |
| 5,489,172 A | 2/1996 | Michler | |
| 6,299,230 B1 | 10/2001 | Oettl | |
| 6,736,458 B2 * | 5/2004 | Chabanne et al. | ......... 297/344.1 |
| 6,902,365 B1 | 6/2005 | Dowty | |
| 7,021,596 B2 | 4/2006 | Lory | |
| 2010/0074680 A1 | 3/2010 | Vine | |

FOREIGN PATENT DOCUMENTS

| | | |
|---|---|---|
| DE | 29712180 U1 | 9/1997 |
| FR | 2893996 A1 | 6/2007 |
| GB | 2406877 A | 4/2005 |

OTHER PUBLICATIONS

European Search Report dated Mar. 11, 2011 issued in corresponding European Patent Appln. No. 10187953.4.

* cited by examiner

*Primary Examiner* — Amy J Sterling
(74) *Attorney, Agent, or Firm* — Glenn M. Massina, Esq; Fox Rothschild LLP

(57) ABSTRACT

A device for fastening a fixture to a fastening structure of a vehicle including: a base comprising a first clamping jaw which can be positioned in a clamping direction (Z) over the slot and pressed in the clamping direction (Z) with respect to the fastening structure, a second clamping jaw comprising a clamping portion which can be inserted into the fastening channel, and a shaft which projects from the clamping portion; an actuating unit which is supported on the base such that it can be moved back and forth; and a gear system which couples the actuating unit to the second clamping jaw such that a movement of the actuating unit generates the longitudinal movement of the second clamping jaw.

28 Claims, 5 Drawing Sheets

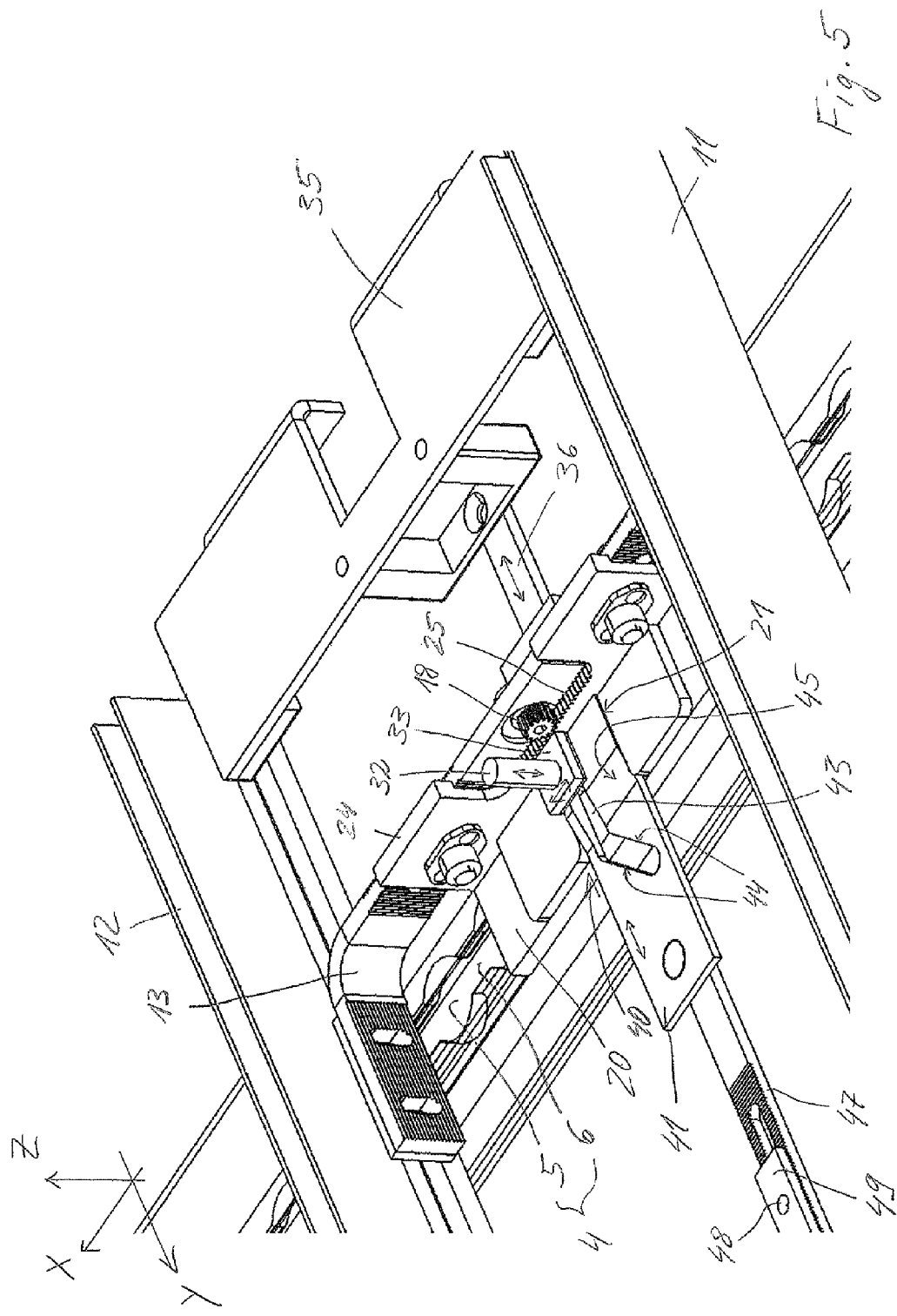

DEVICE FOR FASTENING A FIXTURE TO A FASTENING STRUCTURE OF A VEHICLE

The present invention claims priority to European Patent Application No. 10 187 953.4, filed Oct. 18, 2010, the contents of which are incorporated herein be reference.

FIELD OF THE INVENTION

The invention relates to a device for fastening a container, seat, partition wall or similar fixture to a fastening structure of a vehicle, preferably an aircraft. In particular, it relates to a fastening device for fastening a fixture in the interior of a vehicle, for example in a passenger cabin or in the cockpit of a passenger plane. The invention also, however, relates to devices for fastening in or in principle even on the outside of other types of vehicles, for example rail vehicles such as for example carriages, buses and commercial road vehicles which are used to convey persons or goods.

BACKGROUND OF THE INVENTION

In order to be able to adapt aircraft flexibly to different passenger or cargo requirements, whether by refurbishing or retrofitting, fastening devices are for example known from U.S. Pat. No. 6,902,365 B1 and U.S. Pat. No. 7,021,596 B2. The devices are developed from standardised fastening structures such as are provided in the floors of aircraft cabins. Fastening devices are proposed which comprise co-operating clamping jaws in order to securely fix the respective fixture, such as for example a passenger seat or container, to the fastening structure.

SUMMARY OF THE INVENTION

In view of the known fastening mechanisms, it is an object of the invention to provide a fastening device which is mechanically robust, simple to operate and space-saving, preferably exhibits a low weight, and allows the respective fixture to be fastened in a short period of time.

The invention proceeds from a device for fastening a fixture to a fastening structure of a vehicle, such as for example an aircraft or a railway carriage, which comprises a fastening channel which extends in a longitudinal direction and opens outwards via a slot which extends in the longitudinal direction. The slot comprises slot portions which are alternately wider and comparatively narrower in the longitudinal direction. The fastening channel widens as viewed from the outside, at least behind each of the narrower slot portions, such that a channel wall which can be gripped behind from the outside is provided in each of the narrower slot portions. The fastening structure can correspond to those known in aircraft construction, such as are also described in the cited prior art.

The device can be positioned over the fastening structure as viewed in a clamping direction and includes a base comprising a first clamping jaw which can be pressed in the clamping direction with respect to the fastening structure when positioned, and a second clamping jaw which co-operates with the first clamping jaw. The clamping jaws are designed to clamp the fastening structure in the clamping direction, wherein the first clamping jaw can be directly in a clamping engagement with the fastening structure, i.e. can press directly against the fastening structure, or can press against the fastening structure only indirectly via one or more intermediate structure(s) as viewed in the clamping direction. A direct contact is preferred. For fastening in a clamp, the first clamping jaw can be movable relative to the base; in preferred embodiments, however, it is immovably connected to the base and can in principle even be formed integrally with it, although it is more preferably joined to the base, particularly preferably detachably, such that its position relative to the base can be adjusted.

The second clamping jaw comprises a clamping portion and a shaft which projects from the clamping portion, counter to the clamping direction. The clamping portion is thinner, preferably only slightly thinner, than the slot in the region of the wider slot portions, but wider than the slot in the region of the narrower slot portions. It can be inserted into the fastening channel through one or more of the wider slot portions. The shaft is sufficiently slender that the second clamping jaw is offset in the longitudinal direction when the clamping portion is inserted and situated in the fastening channel, and the clamping portion can thus be moved into overlap with one or more of the narrower slot portions. In simple embodiments, the clamping portion only extends over the length of one of the wider slot portions. In further developments, the clamping portion is sub-divided into a plurality of wider longitudinal portions which are arranged adjacently in the longitudinal direction, spaced apart from each other, and shaped so as to respectively conform to the wider slot portions. The clamping portion which is sub-divided in this way can be inserted into the fastening channel simultaneously through at least two wider slot portions and a narrower slot portion lying between them. The wider longitudinal portions can be connected to each other via one or more thinner connecting portions or separated from each other in the longitudinal direction.

The second clamping jaw is supported on the base such that it can be moved back and forth in the longitudinal direction, such that its clamping portion can be pressed against the catching channel wall, i.e. the channel wall which can be gripped behind, of the fastening channel while or after performing a longitudinal movement after it has been inserted into the fastening channel, in order to clamp the fastening structure between the clamping jaws and so fasten the base to the fastening structure. In embodiments in which the second clamping jaw comes into clamping contact with the fastening structure while it is still performing the longitudinal movement, i.e. due to the longitudinal movement, this can be achieved by a corresponding shape of the clamping portion, for example by the clamping portion tapering in the movement direction at an end which is a leading end in the longitudinal direction, such that in the course of its longitudinal movement, the second clamping jaw presses onto the catching channel wall of the next narrower slot portion at the leading end in the manner of a wedge. In preferred embodiments, however, the longitudinal movement and clamping are controlled such that the clamping movement of one clamping jaw towards the other is initiated, at the earliest, when the second clamping jaw has already performed at least a part of its longitudinal stroke and at least partially overlaps with one of the narrower slot portions. Even more preferably, the longitudinal movement and the clamping stroke movement are completely separated from each other and are performed one after the other in sequence.

The first or second clamping jaw can be moved relative to the base in and counter to the clamping direction in order to be able to perform a clamping stroke for clamping. Within the meaning of the invention, the word "or" is understood here, as elsewhere, to mean "inclusive or", i.e. it encompasses the meaning of "either . . . or" and also the meaning of "and", unless only one of these two meanings can exclusively follow from the respectively specific context. Although the first clamping jaw can be supported on the base such that it can be moved in the clamping direction for the clamping stroke, it is preferred if the second clamping jaw also performs the clamping stroke movement relative to the base, and preferably only the second clamping jaw. In such embodiments, the second clamping jaw can be moved relative to the base not only in the longitudinal direction of the fastening channel but also in and counter to the clamping direction. As mentioned, the two movements are separated from each other in preferred embodiments, i.e. they are performed in sequence; in principle, however, they can also be performed in overlap, i.e. overlapping in time. The first clamping jaw can be immovable relative to the base, at least as far as the clamping engagement is concerned.

The device also includes an actuating unit which is supported on the base such that it can be moved back and forth. The actuating unit can be designed for motorized actuation or for actuation using a tool; in preferred embodiments, it is designed for manual operation, without a tool, and includes a handle in such embodiments. The actuating unit can be formed solely by a handle alone.

The actuating unit is coupled to the second clamping jaw by means of a gear system. The gear system includes a first gear member and a second gear member, one of which comprises a guiding cam and the other of which co-operates with the guiding cam in a guiding engagement as an engaging member. In the guiding engagement, the gear members preferably form a planar or level cam joint. In the guiding engagement, the gear members can be moved translationally back and forth relative to each other and each relative to the base. The movement of the actuating unit generates the longitudinal movement of the second clamping jaw via the guiding engagement. The guiding cam and the guiding engagement are therefore also referred to in the following as the longitudinal guiding cam and longitudinal guiding engagement. In the transmission path from the actuating unit to the second clamping jaw, movements of the actuating unit are transmitted onto the first gear member via one or more intermediate members or preferably directly and are transmitted, in the longitudinal guiding engagement, from the first gear member onto the second gear member, and the movement of the second gear member is transmitted onto the second clamping jaw via one or more intermediate members or preferably directly. Because the gear members can be moved translationally relative to each other and each relative to the base, the transmission of movement and force can be realised in a particularly robust way and also compactly within a limited space. The transmission is also made more robust and compact if the actuating unit acts directly and rigidly on the first gear member or the second gear member acts directly and rigidly on the second clamping jaw. In a first variant, only the movement and force of the actuating unit is directly transmitted, 1:1, onto the first gear member; in a second variant, the only direct transmission is between the second gear member and the second clamping jaw; and in a preferred third variant, both the transmission from the actuating unit onto the first gear member and the transmission from the second gear member onto the second clamping jaw is direct and rigid. In accordance with the three preferred variants, the actuating unit and first gear member on the one hand and the second gear member and second clamping jaw on the other hand are connected to each other—either joined to each other or formed integrally—such that they cannot be moved relative to each other in their respective pairs.

In the longitudinal guiding engagement, the translational movement of the first gear member generates a movement of the second gear member which is preferably only translational relative to the base. Preferably, the gear members can only be moved translationally relative to the base. It is advantageous if they can only be moved linearly; a translational movement, without rotation, along a curved trajectory can however be realised instead. In preferred embodiments, the first gear member only has one degree of freedom of movement along a movement axis relative to the base. The movement axis can in particular point transverse to the clamping direction and the longitudinal direction.

In preferred embodiments, the actuating unit is supported on the base such that it can be moved back and forth translationally, preferably only translationally. It can in particular be movable transverse to the longitudinal direction or the clamping direction. The actuating unit can advantageously only be moved linearly relative to the base and even more advantageously only translationally along a movement axis. It is advantageous with regard to robustness and compactness if the actuating unit is connected to the first gear member such that it is resistant to tensile and shearing forces in relation to its translational mobility. In such embodiments, translations of the actuating unit are transmitted onto the first gear member 1:1, i.e. the first gear member is simply slaved in the movements of the actuating unit.

The second clamping jaw itself can in particular form the second gear member. In terms of a compact and mechanically robust embodiment, it is advantageous if the shaft of the second clamping jaw protrudes beyond the longitudinal guiding cam in and counter to the clamping direction and is in longitudinal guiding engagement with the longitudinal guiding cam, forming the second gear member.

It is advantageous if one of the clamping jaws can be moved relative to the other and relative to the base in and counter to the clamping direction, in order to clamp the fastening structure between the clamping jaws. The relative mobility in the clamping direction in addition to the mobility of the same clamping jaw or as applicable the other clamping jaw is advantageously used in combination with a sequence controller, such that in a first movement phase after insertion into the fastening channel, the clamping portion of the second clamping jaw is moved in the longitudinal direction into overlap with at least one of the narrower slot portions and only then, in a second movement phase, is the clamping movement against the channel wall performed. The two movements are preferably separated at least to such an extent that the second clamping jaw has completed its longitudinal movement before it comes into clamping contact with the channel wall in the second movement phase.

The gear system preferably comprises an additional guiding cam and an engaging member which co-operates with the additional guiding cam in an additional guiding engagement. In the additional guiding engagement, a reciprocating movement of the actuating unit is converted into the clamping movement, directed in or counter to the clamping direction, of the correspondingly movable clamping jaw, preferably the second clamping jaw. The additional guiding cam and the additional guiding engagement are correspondingly also referred to in the following as the clamping guiding cam and the clamping guiding engagement. The clamping guiding cam exhibits an inclination of more than 0° and less than 90° to the clamping direction and also an inclination of more than 0° and less than 90° to a direction of the reciprocating movement of the actuating unit. The clamping guiding cam is thus inclined at an acute angle to the clamping direction and to the movement direction of the actuating unit, wherein the inclination relative to the clamping direction is expediently nearer to 90° and the inclination relative to the movement direction of the actuating unit nearer to 0°. The clamping guiding cam can in particular be formed as a slant, i.e. a straight ramp; in principle, however, it can also extend in the shape of an arc, either over its entire length or also only in sections. It can for example be flattened towards the end of the clamping stroke, in order to be able to achieve a particularly large clamping force.

The clamping guiding cam can be formed on the base or the first clamping jaw or on an optional additional gear member. More preferably, one of the gear members which are in longitudinal guiding engagement with each other also comprises the clamping guiding cam, wherein embodiments in which the first gear member comprises the clamping guiding cam are preferred.

If the first gear member does not comprise the clamping guiding cam, it can form the engaging member which co-operates with the clamping guiding cam. Advantageously, however, the gear system includes an additional, third gear member which co-operates with the clamping guiding cam in the clamping guiding engagement and forms the engaging member of this additional cam gear system. In preferred embodiments, the third gear member is connected to the second clamping jaw such that it cannot be moved in relation to the clamping direction; preferably, it is absolutely immovable relative to the second clamping jaw. It can be formed integrally with the second clamping jaw; more preferably, it is joined to it.

It is conducive to compactness if the first gear member is shaped as a plate with a small plate thickness, as measured in the clamping direction, in the millimetre or sub-millimetre range. Thicknesses of less than 20 mm are preferred, wherein thicknesses of 10 mm or more preferably only arise when the first gear member comprises the clamping guiding cam.

If, as is preferred, the first gear member comprises the longitudinal guiding cam, said guiding cam can advantageously be formed in a passage of the first gear member by a side wall of said passage.

If, as is preferred, the first gear member comprises the clamping guiding cam, the latter can in particular be arranged on a rear side of the first gear member which faces away from the clamping portion of the second clamping jaw and points counter to the clamping direction. Equally, however, it can instead be arranged on the lower side which points in the clamping direction of the first clamping jaw. In such an embodiment, the first gear member would for example be in clamping guiding engagement with a rear side of the base or first clamping jaw. It could then press the first clamping jaw in the clamping direction, if the latter were supported on the base such that it can be moved in the clamping direction, or it could be moved counter to the clamping direction in the clamping guiding engagement and so slave the second clamping jaw in order to press it against the channel wall. Preferably, however, the first gear member cannot be moved in the clamping direction relative to the base, but rather generates a clamping stroke of the second clamping jaw by moving in one plane, preferably along only one axis, in the clamping guiding engagement.

The first gear member is preferably supported, such that it can be moved back and forth, preferably slide back and forth, on a rear side of the base which faces away from the clamping portion of the second clamping jaw or on a component which is connected to said rear side such that it cannot be moved, at least in the clamping direction and preferably in relation to any direction. The design is made more compact if the first gear member is supported, such that it can be moved back and forth, on the rear side of the first clamping jaw. In such embodiments, when the first and second clamping jaw are in clamping engagement, the first gear member is pressed against the first clamping jaw in the clamping direction and the first clamping jaw is thus pressed towards the fastening structure, preferably directly against the fastening structure.

The design is made more compact if the shaft of the second clamping jaw extends through or laterally encompasses the first clamping jaw and the first gear member, either on one side only or on two mutually opposing sides, and the second clamping jaw presses by means of the third gear member against the rear side of the first gear member which faces away from the clamping portion of the second clamping jaw, advantageously in the clamping guiding engagement. The base, preferably the first clamping jaw, can form a transverse guide for the first gear member in order to linearly guide it in its movement which is preferably a reciprocating movement only. The word "transverse" refers here to a direction transverse to a movement direction of the first gear member.

In one development, the first clamping jaw can be adjusted relative to the base in the longitudinal direction. If the position is longitudinally adjusted, the fixture which is to be fastened to the fastening structure can be adjusted in the longitudinal direction of the fastening structure, i.e. its position can be adjusted. It is thus in particular possible to adjust the position within the distance which two immediately adjacent wider slot portions of the fastening structure exhibit from each other. Advantageously, the position can also be longitudinally adjusted when the fixture has been fastened to the fastening structure. For longitudinally adjusting, the first clamping jaw is advantageously guided linearly on the base in the longitudinal direction. For adjusting the longitudinal position, preferred embodiments of the fastening device include an adjusting gear system comprising a first adjusting member which is arranged on the base such that it cannot be moved or preferably such that it can be moved and a second adjusting member which is arranged on the first clamping jaw such that it can be moved or preferably such that it cannot be moved, for example moulded or joined to the first clamping jaw, wherein the adjusting members are in an adjusting engagement with each other which effects the adjustment. The adjusting gear system can in particular be a toothed wheel gear system. One of the adjusting members can then be a rotatable toothed wheel and the other can be a toothed rod which extends in the longitudinal direction and is in toothed engagement with the toothed wheel.

The first clamping jaw advantageously comprises one or more engaging profile(s) which is/are wider than the respective narrower slot portions and can be inserted into one of the wider slot portions in order to fix the first clamping jaw to the fastening structure in a positive fit in the longitudinal direction when the fastening device is positioned relative to the fastening structure. The one or more engaging profiles can be formed as one or more projections on a lower side of the second clamping jaw which faces the fastening structure. The engaging profile(s) is/are advantageously shaped so as to conform to the wider slot portions, such that a zero-clearance or almost zero-clearance seating in the slot is ensured.

If, as is preferred, the device comprises left-hand and right-hand clamping jaws, namely at least a left-hand first clamping jaw and a left-hand second clamping jaw which co-operates with it and at least a right-hand first clamping jaw and a right-hand second clamping jaw which co-operates with it, in order to fasten the fixture to a left-hand fastening structure and a right-hand fastening structure which extends adjacently at a distance, then the statements made with respect to the fastening device and also the features disclosed in the claims apply to both the left-hand and right-hand clamping jaws, unless differences are specifically indicated. The base is preferably common to the left-hand fastening device and the right-hand fastening device. The first clamping jaws and also the second clamping jaws on the left and right can in particular be identical, although this is not absolutely necessary. The same applies to the respective gear system if, as is preferred, the left-hand fastening device and the right-hand fastening device each comprise a gear system for transmitting the movements of an actuating unit.

The left-hand and right-hand fastening device can be not only spatially but also functionally separated from each other and correspondingly able to be actuated by means of a respectively assigned actuating unit of their own. In order to reduce the fitting or retrofitting time when installing, changing or relocating the fixture which is to be fastened to the fastening structure, the left-hand and right-hand fastening device are however coupled to each other in preferred embodiments and can be jointly actuated by operating the actuating unit which is advantageously a common actuating unit in such embodiments. In the preferred embodiments, a fastening device composed of the left-hand and right-hand fastening device comprises a coupling device comprising at least one coupling member which can be moved back and forth relative to the base. The coupling device couples the second clamping jaws to each other by means of the coupling member, preferably via a left-hand gear system and a right-hand gear system of the type described or disclosed in the claims, such that the second clamping jaws respectively perform their reciprocating longitudinal movement, preferably in simultaneous synchrony, when the coupling member performs a reciprocating movement.

The movements of the at least one coupling member are preferably translational movements only, without rotation, such that torques do not have to be transmitted in the coupling. In preferred embodiments, the coupling member is mounted or is installed in the coupling path between the left-hand and right-hand fastening device such that it can only be moved translationally. Advantageously, it can only be moved linearly. It is advantageous if the coupling member can be moved in a transverse direction which points transverse to both the clamping direction and the longitudinal direction. The transverse direction can in particular be orthogonal to both the clamping direction and the longitudinal direction. The coupling device can comprise a plurality of coupling members which can be moved relative to each other for the purpose of coupling and/or when transmitting the movements of the actuating unit. More preferably, however, the coupling device comprises only one coupling member. A coupling which is resistant to tensile and shearing forces is preferred.

The coupling device is preferably formed as an arrangement of rods. Said coupling member can then in particular be rod-shaped. In order to be able to set the composite fastening device to different distances between the left-hand and right-hand fastening device, the length of the coupling member as measured in the distance direction of the two fastening structures can be able to be adjusted. The coupling member can thus in particular be telescopic and can comprise and preferably consist of a plurality of telescopic portions which can be adjusted relative to each other in the transverse direction and fixed relative to each other in the different adjusting positions.

In order to couple the left-hand and right-hand fastening device to each other, the coupling device can connect the left-hand gear system to the right-hand gear system, if the left-hand and right-hand fastening device each comprise a gear system of their own. If the two gear systems each comprise a first gear member and a second gear member of the type described or disclosed in the claims, then the coupling path formed by the coupling device can in particular extend from the left-hand first gear member to the right-hand first gear member, i.e. the coupling device can be linked, in particular rigidly fastened, to the left-hand first gear member and to the right-hand first gear member. In such embodiments, the movement of the common actuating unit is transmitted via the left-hand first gear member onto the left-hand second clamping jaw and via the coupling device onto the right-hand first gear member and from the right-hand first gear member onto the right-hand second clamping jaw.

The coupling between the left-hand and right-hand fastening device can advantageously be resistant to tensile and shearing forces in the movement direction of the actuating unit. In such embodiments, the actuating unit slaves the first gear members in a reciprocating movement, i.e. the actuating unit and the first gear members perform the reciprocating movement jointly as a unit.

The coupling between a left-hand fastening device and a right-hand fastening device is also advantageous in its own right and not only in combination with the translational gear movements of the invention claimed here. The Applicant reserves the right to direct a divisional application to the following subject matter, namely:

A device for fastening a fixture to a left-hand and a right-hand fastening structure (1, 2) of a vehicle, which each comprise a fastening channel (3) which extends in a longitudinal direction (X) and opens outwards along a slot (4) comprising wider and comparatively narrower slot portions (5, 6) and widens as viewed from the outside, at least behind each of the narrower slot portions (6), such that a channel wall (7) which can be gripped behind from the outside is obtained at least in each of the narrower slot portions, said device including:

a) a base (10), comprising a left-hand first clamping jaw (20) which can be positioned in a clamping direction (Z) over the slot of the left-hand fastening structure (1) and pressed in the clamping direction (Z) with respect to the left-hand fastening structure (1), and a right-hand first clamping jaw (20) which can be positioned in the clamping direction (Z) over the slot (4) of the right-hand fastening structure (2) and pressed in the clamping direction (Z) with respect to the right-hand fastening structure (2);

b) a left-hand and right-hand second clamping jaw (30), each comprising a clamping portion (31) which can be inserted into the respective fastening channel (3) through one or more of the wider slot portions (5), and a shaft (32) which projects from the clamping portion (31), counter to the clamping direction (Z), and is more slender than the clamping portion (31), c) wherein the second clamping jaws (30) are supported on the base (10) such that they can be moved back and forth in the longitudinal direction (X), and when they have been inserted, their clamping portion (31) can be pressed against the catching channel wall (7) of the respective fastening channel (3) while or after performing a longitudinal movement, in order to clamp the fastening structures (1, 2) between the clamping jaws (20, 30) and so fasten the base (10) to the fastening structures (1, 2);

d) an actuating unit (35) which is supported on the base (10) such that it can be moved back and forth;

e) a left-hand gear system (40) which couples the actuating unit (35) to the left-hand second clamping jaw (30), and a right-hand gear system (40) which couples the actuating unit (35) to the right-hand second clamping jaw (30), each for translating the movement of the actuating unit (35) into the longitudinal movement of the left-hand and right-hand second clamping jaw (30);

f) and a coupling device (47, 48, 49) which couples the left-hand second clamping jaw (30) and the right-hand second clamping jaw (30), preferably the left-hand gear system (40) and the right-hand gear system (40), to each other by means of at least one coupling member (47, 48, 49) which can be moved back and forth relative to the base (10), such that the second clamping jaws (30) each perform a reciprocating longitudinal movement when the coupling member (47, 48, 49) performs a reciprocating movement.

The reference signs used relate to the figures and, as is usual with claims, are to be understood as examples only. Such a composite fastening device can be advantageously developed by any of the features disclosed here.

The base can itself be adjustable, such that the co-operating clamping jaws can be adjusted, jointly or relative to each other, in parallel or transverse to the clamping direction or transverse to both the clamping direction and the longitudinal direction within the base relative to the fixture which is to be fastened. In such embodiments, the base includes a first structural part which is or can be connected to the fixture, and a second structural part which serves as a bearer for the first clamping jaw and is connected to the first structural part such that it can be adjusted in at least one of said directions. If the fastening device is a composite fastening device comprising a left-hand and right-hand fastening device, then the base advantageously includes a left-hand second structural part for the left-hand fastening device and a right-hand second structural part for the right-hand fastening device, wherein the second structural parts can each be individually adjusted relative to the first structural part in one of the adjusting directions and fixed relative to the first structural part in the respective adjusting position.

BRIEF DESCRIPTION OF THE DRAWINGS

An example embodiment of the invention is described below on the basis of figures. Features disclosed by the example embodiment, each individually and in any combination of features, develop the subjects of the invention described herein. There is shown:

FIG. 5 is a perspective view of the left-hand fastening device.

DETAILED DESCRIPTION

Figure 1:
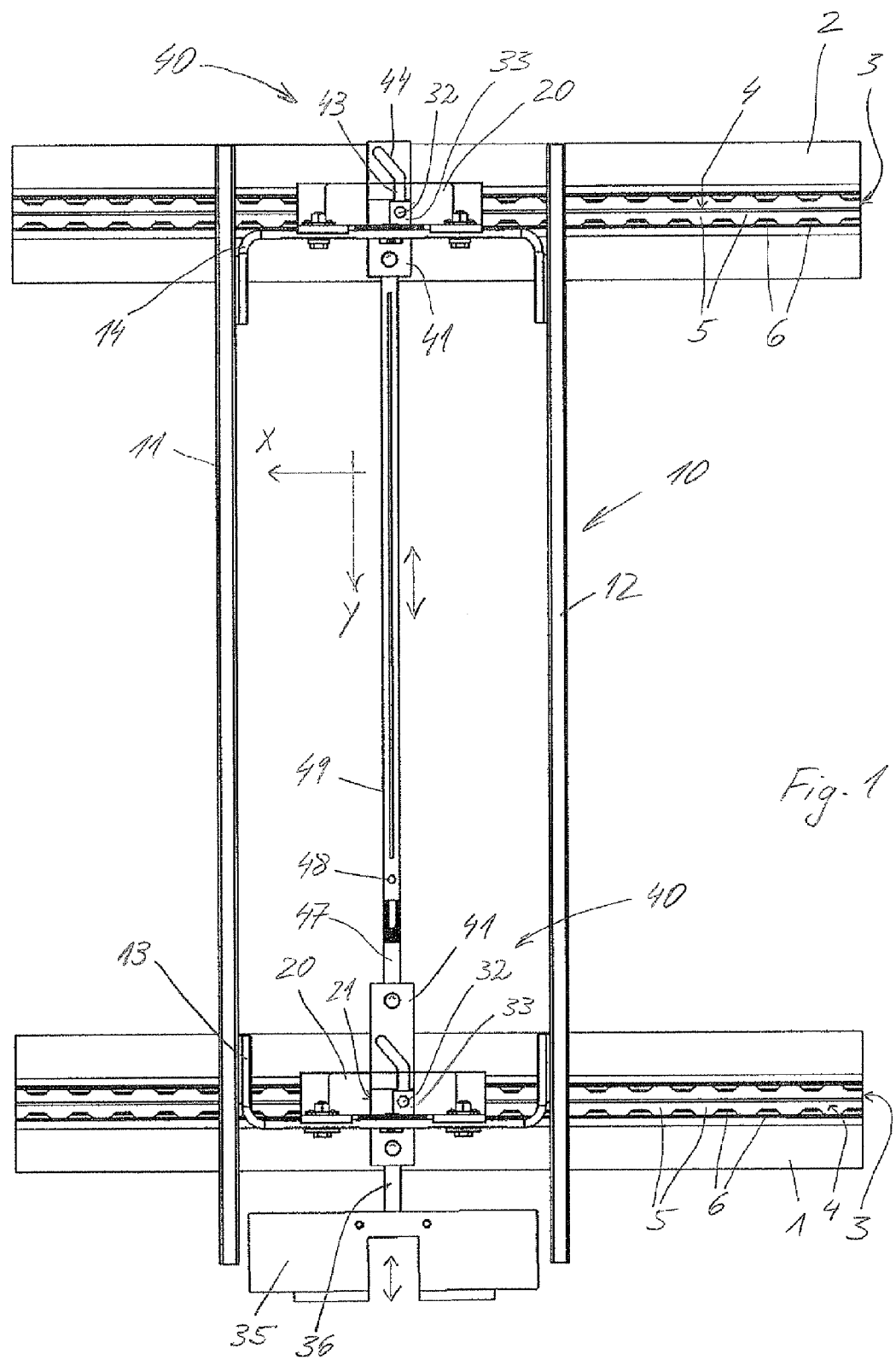
FIG. 1 is top plan view of a composite fastening device comprising a left-hand device in accordance with the invention and a right-hand device in accordance with the invention.

FIG. 1 shows a plan view of a device for fastening a fixture in a vehicle, for example in the interior of an aircraft. The fixture can for example be a seat, a partition wall, a cupboard in a kitchen and/or galley, or other container such as in particular a so-called doghouse.

The fixture can be fastened to a fastening structure which is fixed to the vehicle, such as for example a floor rail, by means of the device. In the vehicle, a left-hand fastening structure 1 and a right-hand fastening structure 2 extend in a longitudinal direction X adjacently and spaced apart from each other in a transverse direction Y. The fastening structures 1 and 2 are identical to each other. They each form a fastening channel 3 which extends in the longitudinal direction X and opens outwards on a free upper side of the respective fastening structure 1 or 2 via a slot 4 which extends continuously in the longitudinal direction X. The slot 4 comprises slot portions which in the longitudinal direction X are alternately and consecutively wider 5 and narrower 6, as measured in the transverse direction Y. As viewed in cross-section, the fastening channel 3 narrows towards the longitudinally continuous slot opening, at least in the regions of the narrower slot portions 6, such that a channel wall 7 (FIG. 4) which can be gripped behind remains in each of the narrower slot portions 6, as viewed from the outside. FIG. 1 shows the device in a fastening position which is assumes when it is properly fastened to the fastening structures 1 and 2. FIG. 1 shows a plan view onto the upper side of the device which faces away from the fastening structures 1 and 2.

The device is composed of a left-hand fastening device which co-operates with the left-hand fastening structure 1 and a right-hand fastening device which co-operates with the right-hand fastening structure 2, wherein the left-hand and right-hand fastening device are or can be connected to the fixture in the region of a common base 10. The right-hand and left-hand fastening device are identical to each other, at least as far as is relevant to the invention, such that statements made with respect to only one respective fastening device apply similarly to the other.

The base 10 includes two bars 11 and 12 which extend in the transverse direction Y adjacently and spaced apart from each other in the X direction. In the region of the fastening structures 1 and 2, the bars 11 and 12 are connected to each other by means of at least one—in the example, exactly one—connector 13 and 14, respectively. The connectors 13 and 14 each exhibit the shape of a flat U as viewed in the plan view and are connected to the respective bar 11 or 12 in the region of their side limbs. The connectors 13 and 14 serve as bearers for clamping jaws of the fastening devices.

Figure 2:
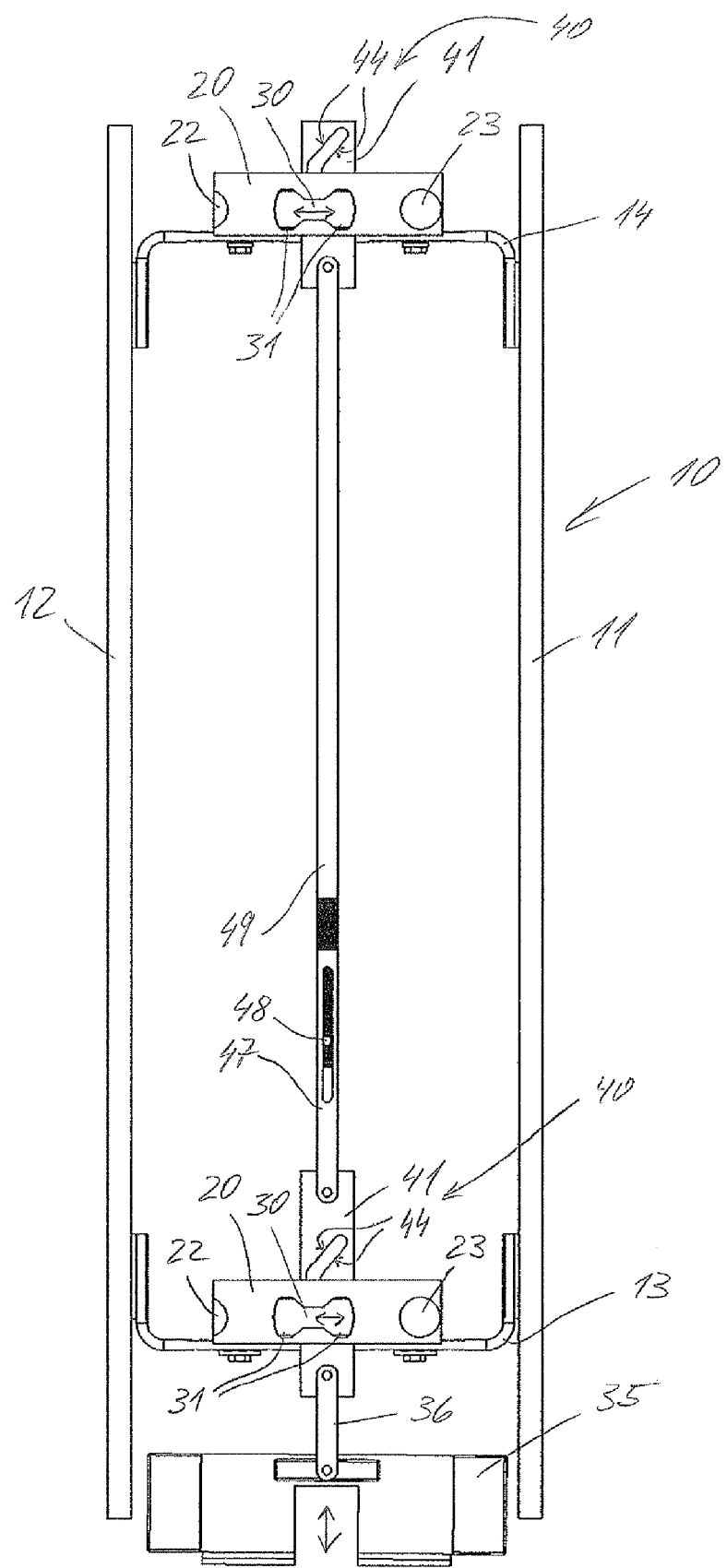
FIG. 2 is a lower plan view of the composite fastening device of FIG. 1.

FIG. 2 shows a plan view onto the lower side of the device composed of the left-hand and right-hand fastening device, separate from the fastening structures 1 and 2. The left-hand and right-hand fastening device each include a first clamping jaw 20 and an assigned second clamping jaw 30 which in co-operation with the assigned first clamping jaw 20 is in a clamping engagement with the respective fastening structure 1 or 2 when fastened.

The lower side of the first clamping jaw 20 which faces the fastening structure 1 or 2 when positioned comprises projecting engaging profiles 22 and 23. The cross-sectional shape of the engaging profiles 22 and 23 is adapted to the wider slot portions 5, such that the engaging profiles 22 and 23 of the positioned first clamping jaw 20 engage in a positive fit with a plurality of wider slot portions 5—in the example embodiment, exactly two wider slot portions 5. The clamping jaws 20 are thus fixed such that they cannot be moved or at least can hardly be moved relative to the fastening structures 1 and 2 in the longitudinal direction X when the device is positioned. The device as a whole is thus also fixed to the fastening structures 1 and 2 in the longitudinal direction X.

Figure 4:
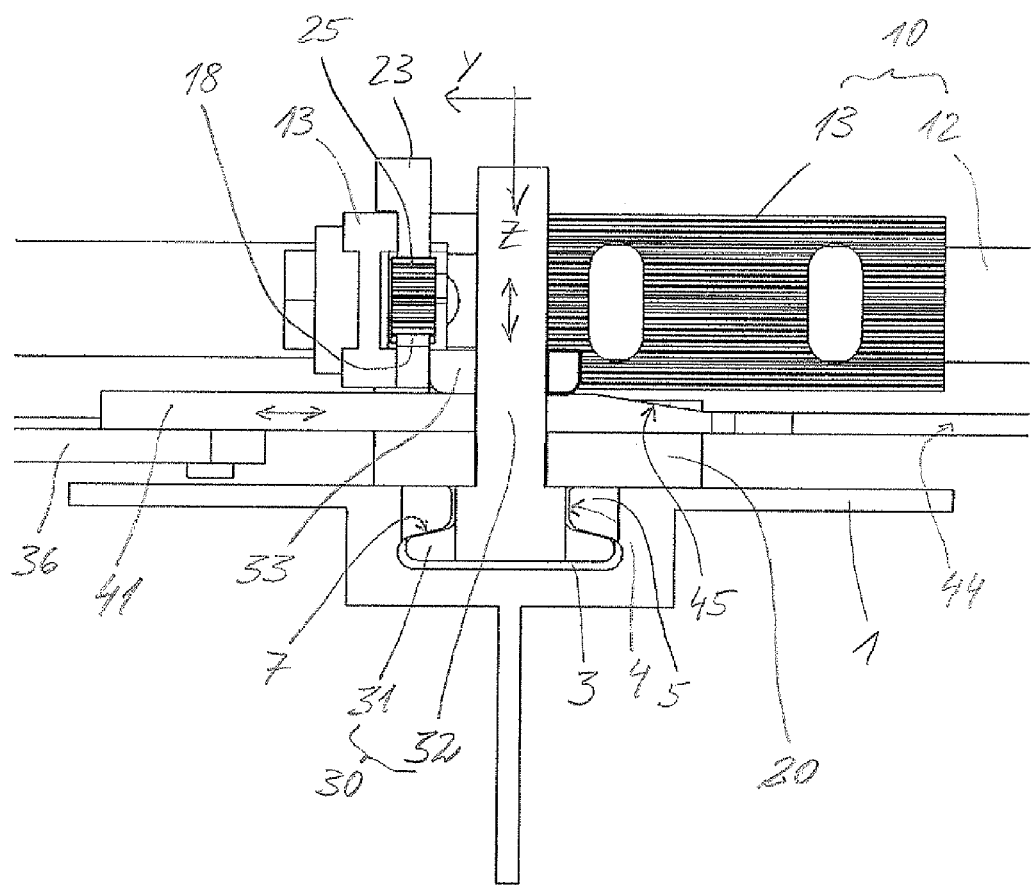
FIG. 4 is a cross-sectional view of the left-hand fastening device of FIG. 1.

As can be seen from an overview of FIGS. 2 and 4, the second clamping jaws 30 each comprise a clamping portion 31 and a shaft 32 which is thinner than the clamping portion 31 in the transverse direction Y. When the device is positioned, the shaft 32 (FIG. 4) extends through the slot 4 in a clamping direction Z which is orthogonal to the X-Y plane of the fastening structures 1 and 2. The clamping portion 31 is arranged at one end of the clamping jaw 20 in the Z direction. As viewed in the plan view (FIG. 2), the clamping portion 31 comprises a wider left-hand longitudinal portion and a wider right-hand longitudinal portion and a thinner connecting portion between them, such that in the plan view, it has approximately the shape of a dog's bone. The wider longitudinal portions are slightly thinner than the wider slot portions 5 but wider than the narrower slot portions 6, such that the clamping jaws 30 can be inserted into the respective fastening structure 1 or 2 through the latter's slot 4 when the wider longitudinal portions of the clamping jaws 30 are situated level with a respective wider slot portion 5 as viewed in the longitudinal direction X.

FIG. 4 shows a cross-section of one of the fastening devices, for example the left-hand fastening device (as also representative of the right-hand fastening device), when it has been fastened to the fastening structure 1. The fastening structure 1 is clamped between the first clamping jaw 20 and the second clamping jaw 30 in the clamping direction Z. In this clamping engagement, the clamping jaw 20 presses in the clamping direction Z against the fastening structure 1 from the outside, and the clamping portion 31 of the clamping jaw 30 presses counter to the clamping direction Z against the fastening channel 3 from the inside of the fastening channel 3 while gripping behind the channel wall 7. The flow of force passing through the clamping point is closed within the fastening device.

The second clamping jaws 30 are each mounted such that they can be linearly moved back and forth in the longitudinal direction X relative to the base 10 and relative to the assigned first clamping jaw 20. This is respectively indicated in FIG. 2 by a double-headed movement arrow. The clamping jaws 30 are also likewise mounted such that they can be linearly moved back and forth in the clamping direction Z relative to the base 10 and the respectively assigned clamping jaw 20, as indicated in FIG. 4 by the double-headed arrow which points in the Z direction.

In order for the clamping engagement with the fastening structures 1 and 2 to be able to be established and then released again, the device includes an actuating unit 35 which can be operated manually and advantageously without a tool. The actuating unit 35 can be moved translationally back and forth relative to the base 10—in the example embodiment, linearly in the transverse direction Y, as is preferred. The actuating unit 35 is coupled to the left-hand second clamping jaw 30 by means of a left-hand gear system 40 and to the right-hand second clamping jaw 30 by means of a right-hand gear system 40. A reciprocating movement of the actuating unit 35 in the transverse direction Y is converted into a reciprocating longitudinal movement of the clamping jaws 30 in the longitudinal direction X and also into stroke movements in and counter to the clamping direction Z by means of the gear systems 40.

Figure 3:
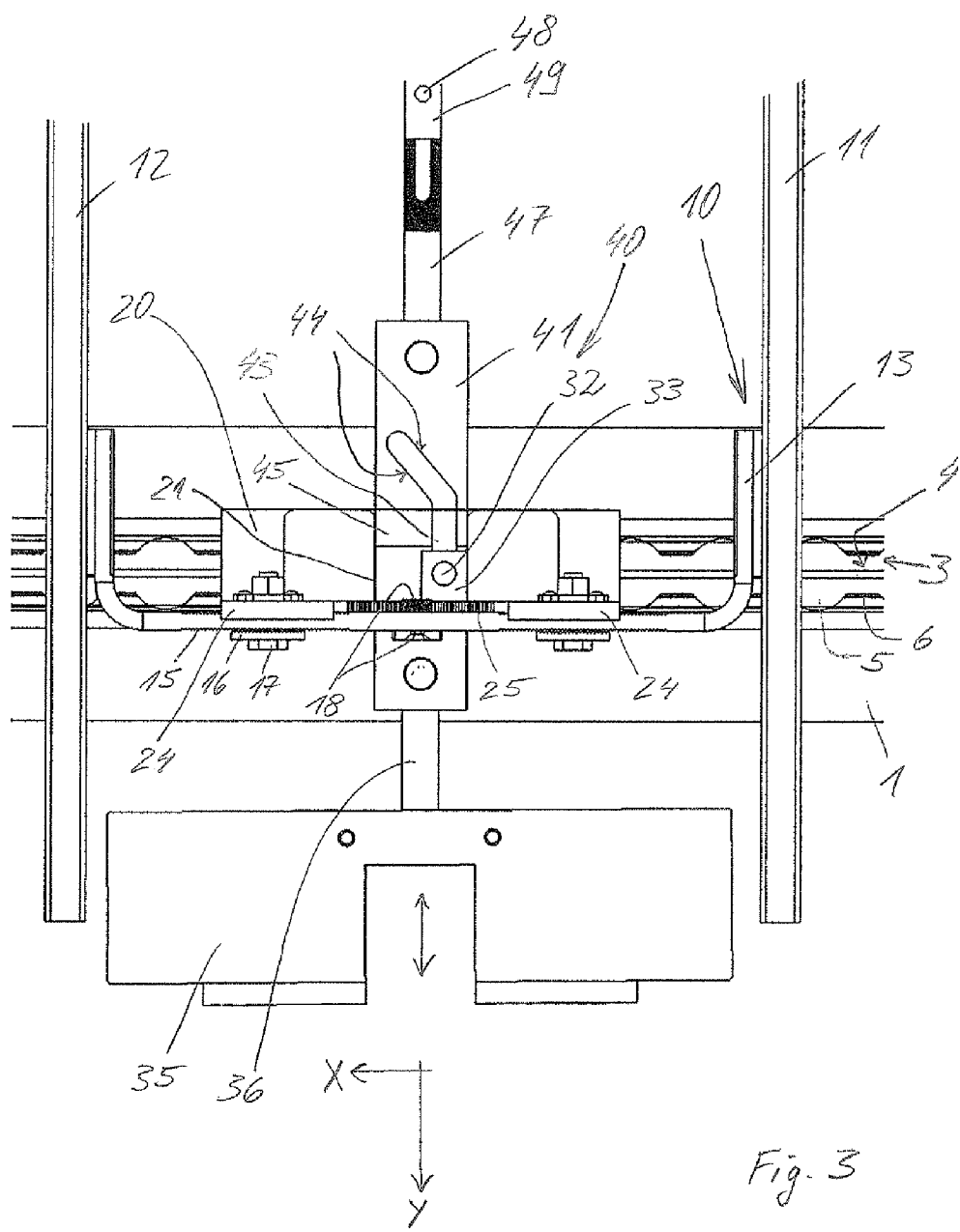
FIG. 3 is a top plan view of the left-hand fastening device of FIG. 1.

The left-hand and right-hand fastening device are coupled by means of a coupling device, such that both fastening devices can be actuated by means of the same actuating unit 35 in order to clamp and release the clamping engagement. The coupling device consists of a coupling member 47-49 which is resistant to tensile and shearing forces in the transverse direction Y and is for example realised in the form of a slender coupling rod which is elongated in the Y direction. The coupling member 47-49 connects the two gear systems 40 to each other. FIG. 3 shows the actuating unit 35 and the left-hand fastening device which is nearer to it, in an enlarged representation as compared to FIG. 1, on the basis of which the functionality of the left-hand gear system 40 (as also representative of the right-hand gear system) is described in conjunction with FIG. 4 and the perspective view in FIG. 5. The gear system 40 includes a first gear member 41 and a second gear member 32 which co-operate with each other in a longitudinal guiding engagement in which a reciprocating movement of the actuating unit 35 in the Y direction is converted into a reciprocating longitudinal movement of the second clamping jaw 30 in the longitudinal direction X. The gear member 41 comprises a longitudinal guiding cam 44, and the gear member 32 forms an engaging member which co-operates with the guiding cam 44 in the longitudinal guiding engagement. The longitudinal guiding cam 44 extends in the longitudinal direction X and the transverse direction Y; it is for example a guiding cam which extends in the X-Y plane. It is inclined at an angle of more than 0° and less than 90° to both the X axis and the Y axis, respectively. It is for example formed as a slant; in principle, it could also extend in the shape of an arc or comprise one or more arc-shaped portions or one or more slanted portions which are variously inclined.

The gear member 32 is formed directly by the clamping jaw 30, namely by its shaft 32 which extends through the gear member 41 for this purpose, as can be seen in FIG. 4, in order to co-operate, while extending through, with the longitudinal guiding cam 44. The gear member 41 corresponding comprises a passage in the clamping direction Z, the side wall of which forms the longitudinal guiding cam 44. The design is made more space-saving and compact by the fact that the shaft 32 also extends through the first clamping jaw 20. As viewed from the fastening channel 3, the shaft 32 extends first through the slot 4, then through the first clamping jaw 20 and then through the passage of the gear member 41. The gear member 41 can slide back and forth in the transverse direction Y on the upper side of the clamping jaw 20 which faces away from the fastening channel 3, wherein it is linearly guided in the transverse direction Y by a transverse guide 21 formed by the clamping jaw 20, for example between transverse guiding surfaces 21 (FIGS. 3 and 5).

The gear system 40 includes an additional guiding engagement, a clamping guiding engagement, in which the first gear member 41 co-operates with a third gear member 33. The gear member 41 forms a clamping guiding cam 45 for the clamping guiding engagement, and the third gear member 33 forms the engaging member which co-operates with it in the clamping guiding engagement. The clamping guiding cam 45 extends at least substantially in the transverse direction Y and clamping direction Z. It can best be seen in FIGS. 4 and 5. The guiding cam 45 is inclined at an angle of more than 0° and less than 90° to both the Y direction and the Z direction, respectively, wherein the inclination as measured onto the Y axis is significantly smaller than the inclination as measured onto the Z axis. In the example embodiment, the clamping guiding cam 45 is straight; it forms a ramp which is flat in the Y direction. The third gear member 33 is connected to the second clamping jaw 30 such that it cannot be moved at least in relation to the Z direction. It is for example joined to the clamping jaw 30 such that it cannot be moved, as is preferred. It could in principle be formed integrally with the clamping jaw 30; however, forming it separately and then joining it is advantageous with regard to assembling the device. The guiding cam 45 is arranged on a rear side—when positioned on the upper side—of the first gear member 41 which faces away from the clamping portion 31 of the clamping jaw 30, for example formed on the gear member 41, as is preferred. The clamping guiding cam 45 forms a thickened region of the gear member 41. The gear member 41 lies flat on the clamping jaw 20; in a modification, it could be bent away from its substrate—in the present case, the clamping jaw 20—in the region of the guiding cam 45, forming the guiding cam 45. It is, however, preferred if the gear member 41 lies on the clamping jaw 20 across the extent of the guiding cam 45 and the guiding cam 45 is formed by a corresponding thickening of the gear member 41, due to the greater rigidity.

The longitudinal guiding cam 44 and the second gear member 32 form a first cam joint in the longitudinal guiding engagement. The clamping guiding cam 45 and the third gear member 33 form a second cam joint. The two cam joints are separated from each other in their functionality, in the sense that only one of the two guiding engagements is ever extant while the actuating unit 35 is performing a reciprocating movement, such that a sequence controller is obtained which ensures that the longitudinal movement and the clamping stroke movement of the clamping jaws 30 are only ever performed one after the other.

It may also be added with respect to the longitudinal guiding cam 44 that the gear member 41 is configured such that depending on the movement direction ±Y of the actuating unit 35, the gear member 41 can be moved in the transverse direction ±Y, decoupled from the gear member 32, before or after the longitudinal guiding engagement. This is solved by the fact that the passage which forms the guiding cam 44 extends further from one end of the guiding cam 44, exactly in the transverse direction Y, such that in this continuation of the passage, which is provided with the reference sign 43 in FIGS. 3 and 5, there is no engagement to generate movements of the clamping jaws 30. The continuation 43 overlaps with the guiding cam 45 in the transverse direction Y. While the gear member 32 passes through the continuation 43, the third gear member 33 and the clamping guiding cam 45 are in the clamping guiding engagement which generates the stroke movement in the Z direction.

With reference to FIGS. 1 to 5, the functionality of the device is as follows.

The device is positioned relative to the fastening structures 1 and 2 such that it assumes the fastening position which can be seen from FIG. 1, in which the clamping jaws 20 and 30 are situated over the fastening structures 1 and 2 as viewed in the clamping direction Z and the wider longitudinal portions of the clamping jaws 30 are each situated over a wider slot portion 5 in the longitudinal direction X. In this position, aligned in the X direction and Y direction, the clamping jaws 30 can be inserted into the fastening channel 3 through the slot 4. When inserted, the engaging profiles 22 and 23 of the clamping jaws 20 each pass into a positive-fit engagement with one of the wider slot portions 5. The device then assumes the fastening position, i.e. it is aligned relative to the fastening structures 1 and 2 in the X direction and Y direction and is seated on the fastening structures 1 and 2 in the region of the clamping jaws 20. It then has only one degree of freedom of movement relative to the fastening structures 1 and 2, namely in the Z direction. Establishing the clamping engagement deprives it of this degree of freedom of movement, such that it is fixedly connected to the fastening structures 1 and 2 in a positive fit and a frictional fit.

In order to establish the clamping engagement, the actuating unit 35 which is arranged on the operating side of the device is moved in the transverse direction Y while the device is situated in the fastening position. In the example embodiment, the actuating unit 35 is pressed into the Y position, which it already assumes in the figures, in order to establish the clamping engagement. The figures show the device with the clamping engagement already established, wherein in said clamping engagement, the fastening structures 1 and 2 are clamped in the Z direction between the first clamping jaws 20 and the clamping portions 31 of the second clamping jaws 30, and the device and correspondingly the fixture is held in a clamp on the fastening structures 1 and 2, as can best be seen from FIG. 4.

In order to release the clamping engagement, the user grips the actuating unit 35, which is formed with a handle which is suitable for exerting a tensile force, and draws it towards himself—downwards in each of FIGS. 1 to 3. The actuating unit 35 is connected such that it is fixed, i.e. cannot be moved, in its movement direction Y to the first gear member 41 of the left-hand fastening device by means of a transmission member 36 which is resistant to tensile and shearing forces, such that said gear member 41 is slaved in the movement of the actuating unit 35 and is moved towards the user. The first gear member 41 of the right-hand fastening device is connected, such that it is resistant to tensile and shearing forces, to the gear member 41 of the left-hand fastening device via the coupling device 47-49, i.e. it is slaved in the movement of the gear member 41 of the left-hand fastening device in the Y direction. The actuating unit 35 and the gear members 41 perform the same movement in the transverse direction Y; they form a movement unit.

In the course of the transverse movement, the third gear member 33 of the left-hand and right-hand fastening device passes into the region of the respective clamping guiding cam 45 (FIGS. 3 to 5), thus reducing the clamping force in the clamping engagement and ultimately releasing the clamping engagement in accordance with the inclination of the guiding cam 45. While the third gear member 33 passes through the clamping guiding cam 45 in the transverse direction Y, wherein the gear members 41 are moved in the transverse direction Y relative to the base 10 and the gear members 33 cannot be moved in the Y direction, the second gear member 32 is free of the first gear member 41 and passes through the continuation 43. Once the clamping engagement has been released, the second gear member 32 passes into the longitudinal guiding engagement with the longitudinal guiding cam 44 when the actuating unit 35 is moved further in the same Y direction. Due to the inclination of the guiding cam 44, the latter presses the gear member 32 and therefore the second clamping jaw 30 in the longitudinal direction X—to the left in the representation in FIGS. 1 and 3. This longitudinal stroke is sufficiently long that the wider longitudinal portions of the respective clamping portion 31 pass into the region of the wider slot portions 5 again, such that at the end of the longitudinal stroke, with the actuating unit 35 completely extended, the clamping jaws 30 can be drawn out of the fastening channel 3 and the device together with the fixture fastened on or to it can be removed, for example lifted, from the fastening structures 1 and 2.

One particular advantage of the device is that the movable components, such as in particular the clamping jaws 30, the gear members 41 and also the actuating unit 35, can only be moved translationally, although the latter could be supported on the base 10 such that it can also be pivoted or otherwise rotated. The flat design of the device, in particular the gear members 41 and the clamping jaws 20, is also advantageous. The flat design is also particularly apparent in FIG. 4. The first clamping jaw 20 and the first gear member 41 which can slide on it are stacked one above the other in a layered design. Due to the translational mobility and the correspondingly configured guiding engagement at 44 and/or 45, torques do not have to be transmitted. This makes the device more rigid and therefore more robust. The weight can be kept low, an advantage which in aeronautical engineering in particular is not to be ignored. The sequential controller or sequence controller of the longitudinal stroke movement and the clamping stroke movement may be regarded as another particular advantage.

The device allows the fastening structures 1 and 2 and also the respective fixture to be flexibly adapted to local conditions. The left-hand and right-hand fastening device can for example be adjusted in the Z direction relative to the bars 11 and 12, in order to be able to adjust the fixture to a certain extent in the Z direction. For this adjustability, the connectors 13 and 14 are connected to the bars 11 and 12 such that they can be adjusted in the Z direction and fixed in any adjusting position. The connection can in particular be a screw connection. For the adjustability in the Z direction, the connectors 13 and 14 comprise elongated holes which extend in the Z direction. Alternatively, such elongated holes could instead be provided in the bars 11 and 12. For the purpose of adjustability, the bars 11 and 12 form a first structural part of the base 10, and the connectors 13 and 14 form a second structural part of the base 10 which can be adjusted relative to the first structural part.

The device also allows at least one of the two fastening devices to be adjusted in the transverse direction Y relative to the base 10 and in particular relative to the other fastening device. The adjustability in the Y direction is advantageous because in different vehicles, the fastening structures 1 and 2 do not always have the same distance from each other in the transverse direction Y. As with adjusting in the Z direction, the adjustment relative to the base 10 can be achieved by means of elongated holes in the bars 11 and 12 or connectors 13 and 14 which correspondingly extend in the Y direction. For the transverse adjustment, the coupling device 47-49 can likewise be adjusted in the transverse direction Y, for example telescopically as is preferred. In the example embodiment, the coupling member 47-49 is split into a first coupling portion 47 and a second coupling portion 49 which can be adjusted relative to each other in the Y direction and fixed to each other in the respective adjusting position by means of a fixation 48, for example a screw connection, in order to ensure that the coupling is resistant to tensile and shearing forces in the Y direction.

Lastly, the device can also be adjusted in the longitudinal direction X. This adjustability is above all advantageous when one wishes to adjust the device to an intermediate position which does not correspond to the distance between respective immediately adjacent slot portions 5, i.e. it is advantageous with regard to adjusting in the X direction within the longitudinal separation of the fastening structures 1 and 2. In principle, however, the longitudinal adjustability is also advantageous because in many installation locations, only a limited number of free wider slot portions 5 are available for inserting the clamping jaws 30.

For longitudinally adjusting, the device includes an adjusting gear system such as can be seen in particular from FIG. 5, but also from FIGS. 3 and 4. The adjusting gear system includes a first adjusting member 18 and a second adjusting member 25 which is in an adjusting engagement with the first adjusting member. The adjusting member 18 is a toothed wheel which is rotatably mounted on the base 10, and the adjusting member 25 is a row of teeth 25 which are in toothed engagement with the toothed wheel. The row of teeth 25 cannot be moved relative to the first clamping jaw 20, at least in the X direction; they are for example formed on the first clamping jaw 20. Alternatively, they could be joined to the clamping jaw 20. For longitudinally adjusting, the clamping jaw 20 is connected to the base 10, for example by means of two fastening elements 17, one on the left of the adjusting engagement and one on the right of the adjusting engagement. The connection is a screw connection in each case. The connection is not only a force-fit connection but also a positive-fit connection, wherein the positive fit is established by fine toothings 15 and 16, one of which is provided on the base—on the connector 13 in FIG. 3—and the other of which is provided on discs 16 which are assigned to the fastening elements 17.

For longitudinally adjusting, the fastening elements 17 are loosened to such an extent that the positive-fit engagement between the toothings 15 and 16 is released. In this released state, the adjusting member 18 is adjusted—in the example embodiment, turned—such that the clamping jaw 20 is adjusted in the longitudinal direction X relative to the base 10 in the adjusting engagement. In the new adjusting position, the fixation is re-established by tightening the fastening elements 17 and also secured in a positive fit by the toothings 15 and 16. A similar adjustment and/or adjusting gear system 18, 25 is also provided on the right-hand fastening device. The adjustment can for example be made using a screwdriver-like tool, and in the case of the right-hand fastening device which faces away from the user, can advantageously be made using such a tool with a long shaft, even when the device is fastened.

What is claimed:

1. A device for fastening a fixture to a fastening structure of a vehicle, which comprises a fastening channel which extends in a longitudinal direction (X) and opens outwards along a slot comprising wider and comparatively narrower slot portions and widens as viewed from the outside, at least behind each of the narrower slot portions, such that a catching channel wall which can be gripped behind from the outside is obtained at least in each of the narrower slot portions, said device including:
   a) a base comprising a first clamping jaw positionable in a clamping direction (Z) over the slot and pressable in the clamping direction (Z) with respect to the fastening structure;
   b) a second clamping jaw comprising a clamping portion insertable into the fastening channel through one or more of the wider slot portions, and a shaft which projects from the clamping portion, counter to the clamping direction (Z), and is more slender than the clamping portion,
   c) wherein the second clamping jaw is supported on the base such that it is moveable back and forth in the longitudinal direction (X), and when it has been inserted, its clamping portion is pressable against the catching channel wall of the fastening channel while or after performing a longitudinal movement, in order to clamp the fastening structure between the clamping jaws and so fasten the base to the fastening structure;
   d) an actuating unit which is supported on the base such that it is moveable back and forth; and
   e) a gear system which couples the actuating unit to the second clamping jaw and comprises a first gear member and a second gear member, one of first and second gear members including a longitudinal guiding cam and the other forming an engaging member which co-operates with the longitudinal guiding cam in a longitudinal guiding engagement,
   (f) wherein in the longitudinal guiding engagement, the gear members are moveable translationally back and forth relative to each other and each relative to the base, such that a movement of the actuating unit generates the longitudinal movement of the second clamping jaw (30).

2. The device according to claim 1, wherein in the longitudinal guiding engagement, a solely translational movement of the first gear member relative to the base generates a solely translational movement of the second gear member relative to the base.

3. The device according to claim 1, wherein the first gear member can only be moved translationally relative to the clamping jaws and the second gear member can only be moved translationally relative to the first clamping jaw.

4. The device according to claim 1, wherein the second gear member is connected to the second clamping jaw such that it cannot be moved relative to the second clamping jaw in directions transverse to the clamping direction (Z), or is integrally formed with the second clamping jaw.

5. The device according to claim 4, wherein the second gear member is connected to the second clamping jaw such that it cannot be moved relative to the second clamping jaw in the clamping direction (Z), or is integrally formed with the second clamping jaw (30).

6. The device according to claim 1, wherein the actuating unit is supported on the base such that it is moveable back and forth translationally and is connected to the first gear member.

7. The device according to claim 6, wherein the actuating unit is supported on the base such that it is moveable transverse to the longitudinal direction (X) or clamping direction (Z).

8. The device according to claim 6, wherein the actuating unit is connected to the first gear member such that it is resistant to tensile and shearing forces with respect to its translational mobility.

9. The device according to claim 1, wherein the shaft of the second clamping jaw protrudes beyond the longitudinal guiding cam in and counter to the clamping direction (Z).

10. The device according to claim 9, wherein the shaft of the second clamping jaw protrudes in the clamping direction (Z) through the gear member which comprises the longitudinal guiding cam, in the region of the longitudinal guiding cam.

11. The device according to claim 1, wherein one of the clamping jaws is moveable relative to the other in and counter to the clamping direction (Z), in order to clamp the fastening structure between the clamping jaws, and the clamping jaw which can be moved in the clamping direction (Z) is coupled to the actuating unit such that a reciprocating movement of the actuating unit generates the movement of said clamping jaw in and counter to the clamping direction (Z).

12. The device according to claim 11, wherein the second clamping jaw is moveable relative to the base and the first clamping jaw in and counter to the clamping direction (Z), in order to clamp the fastening structure between the clamping jaws.

13. The device according to claim 11, wherein the clamping jaw which can be moved in the clamping direction (Z) is coupled to the actuating unit by means of the gear system such that a reciprocating movement of the actuating unit generates the movement of said clamping jaw in and counter to the clamping direction (Z).

14. The device according to claim 13, wherein the gear system comprises a clamping guiding cam and an engaging member which co-operates with the clamping guiding cam in a clamping guiding engagement in which the reciprocating movement of the actuating unit generates the movement, in and counter to the clamping direction (Z), of the clamping jaw which is moveable in the clamping direction (Z), and the clamping guiding cam exhibits an inclination of more than 0° and less than 90° to the clamping direction (Z) and an inclination of more than 0° and less than 90° to a direction (Y) of the reciprocating movement of the actuating unit.

15. The device according to claim 14, wherein either one of the gear members or the first clamping jaw or an optional additional gear member is the engaging member which co-operates with the clamping guiding cam in the clamping guiding engagement.

16. The device according to claim 15, wherein the gear system comprises said additional engaging member and said additional engaging member is said engaging member which co-operates with the clamping guiding cam in the clamping guiding engagement.

17. The device according to claim 15, wherein said engaging member cannot be moved relative to the second clamping jaw.

18. The device according to claim 14, wherein either one of the gear members which co-operate in the longitudinal guiding engagement or an optional additional gear member or the first clamping jaw comprises the clamping guiding cam.

19. The device according to claim 18, wherein the first gear member comprises the clamping guiding cam.

20. The device according claim 14, wherein either one of the gear members which co-operate in the longitudinal guiding engagement or an optional additional gear member or the first clamping jaw comprises the clamping guiding cam on a rear side which points counter to the clamping direction (Z) or on a lower side which points in the clamping direction (Z).

21. The device according to claim 1, wherein the gear system forms a sequence controller which separates the longitudinal movement of the second clamping jaw from the movement in the clamping direction (Z), such that when the actuating unit performs a reciprocating movement, the longitudinal movement of the second clamping jaw and the movement in the clamping direction (Z) are performed one after the other.

22. The device according to claim 1, wherein the first clamping jaw comprises an engaging profile which is wider than the respective narrower slot portions and is insertable into one of the wider slot portions in order to fix the first clamping jaw to the fastening structure in a positive fit in the longitudinal direction (X).

23. The device according to claim 1, wherein the position of the first clamping jaw is adjustable relative to the base in the longitudinal direction (X) or the clamping direction (Z) or in a transverse direction (Y) pointing transverse to both these directions (X, Z), and the first clamping jaw can be fixed in correspondingly different positions relative to the base.

24. The device according to claim 23, wherein the first clamping jaw is fixable in said correspondingly different positions relative to the base by means of an adjusting gear system comprising a first adjusting member which is supported on the base and a second adjusting member which is supported on the first clamping jaw and is in an adjusting engagement with the first adjusting member.

25. A device according to claim 1, wherein the fastening structure forms a left-hand fastening structure, the clamping jaws form left-hand clamping jaws, the gear system forms a left-hand gear system, and the device also includes:
  g) a right-hand fastening structure which extends adjacently to the left-hand fastening structure and forms a fastening channel which likewise extends in the longitudinal direction (X) and opens outwards along a slot comprising wider and comparatively narrower slot portions and widens as viewed from the outside, at least behind each of the narrower slot portions, such that a channel wall which can be gripped behind from the outside is obtained at least in each of the narrower slot portions;
  h) a right-hand first clamping jaw which is supported on the base and is positionable in the clamping direction (Z) over the slot of the right-hand fastening structure and pressed in the clamping direction (Z) with respect to the right-hand fastening structure;
  i) a right-hand second clamping jaw comprising a clamping portion insertable into the fastening channel through one or more of the wider slot portions, and a shaft which projects from the clamping portion, counter to the clamping direction (Z), and is more slender than the clamping portion,
  j) wherein the right-hand second clamping jaw is supported on the base such that it is moveable back and forth in the longitudinal direction (X), and when it has been inserted, its clamping portion is pressable against the catching channel wall of the right-hand fastening channel while or after performing a longitudinal movement, in order to clamp the right-hand fastening structure between the right-hand clamping jaws and so fasten the base to the right-hand fastening structure;

k) a right-hand gear system for translating the movement of the actuating unit into the longitudinal movement of the right-hand second clamping jaw; and l) a coupling device which couples the left-hand second clamping jaw and the right-hand second clamping jaw to each other by means of a coupling member which is moveable back and forth relative to the base, such that the second clamping jaws each perform a reciprocating longitudinal movement when the coupling member performs a reciprocating movement.

26. The device according to claim 25, wherein the coupling device couples the left-hand gear system and the right-hand gear system to each other by means of the coupling member.

27. The device according to claim 25, wherein the left-hand clamping jaws are the clamping jaws in accordance with claim 1 and the left-hand gear system is the cam gear system in accordance with claim 1.

28. The device according to claim 25, wherein the right-hand gear system further comprises a first gear member and a second gear member in accordance with the left-hand gear system, which co-operate in a longitudinal guiding engagement in order to convert the movement of the actuating unit into the longitudinal movement of the second clamping jaw, and the coupling device connects the first gear members to each other in the movement direction (Y), such that they are resistant to tensile and shearing forces.

* * * * *